United States Patent [19]

Kamiyama

[11] Patent Number: 5,381,244

[45] Date of Patent: *Jan. 10, 1995

[54] IMAGE READING SYSTEM USING AN INTERRUPTION OF A PULSE TRAIN TO ADJUST A SCANNING PERIOD

[75] Inventor: Akira Kamiyama, Yokohama, Japan

[73] Assignee: Fujitsu Limited, Kawasaki, Japan

[ * ] Notice: The portion of the term of this patent subsequent to Jan. 11, 2014 has been disclaimed.

[21] Appl. No.: 135,972

[22] Filed: Oct. 14, 1993

Related U.S. Application Data

[60] Division of Ser. No. 938,579, Sep. 2, 1992, Pat. No. 5,278,675, which is a continuation of Ser. No. 442,873, Nov. 29, 1989, abandoned.

[30] Foreign Application Priority Data

Nov. 30, 1988 [JP] Japan ............................ 63-303008

[51] Int. Cl.$^6$ ............................................ H04N 1/04
[52] U.S. Cl. .................... 358/486; 358/409; 358/410; 358/496
[58] Field of Search ............ 358/486, 412, 413, 409, 358/410, 496

[56] References Cited

U.S. PATENT DOCUMENTS 5,278,675  1/1994  Kamiyama ...................... 358/486

Primary Examiner—Edward L. Coles, Sr.
Assistant Examiner—Thomas L. Stoll
Attorney, Agent, or Firm—Nikaido, Marmelstein, Murray & Oram

[57] ABSTRACT

An image reading system including a charge storing type image sensor drives a manuscript or an image sensor in accordance with a driving pulse from a driving unit. A speed of the driving pulse from the driving unit is determined by a speed setting unit, depending on a change of a period of the apparatus scan. The driving pulse is stopped for a certain period of time, so that the difference in a speed of the driving pulse between the different apparatus scan periods is decreased.

2 Claims, 12 Drawing Sheets

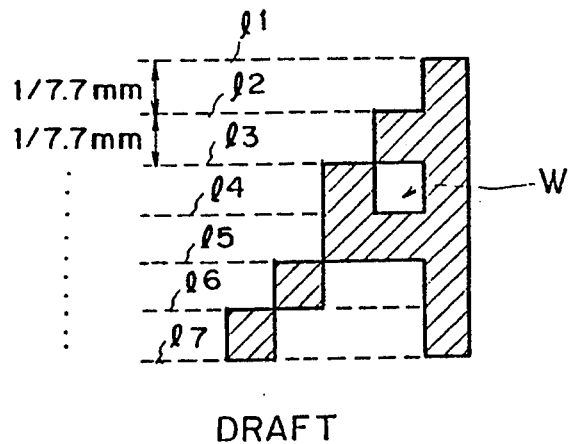
Fig. 1A  DRAFT
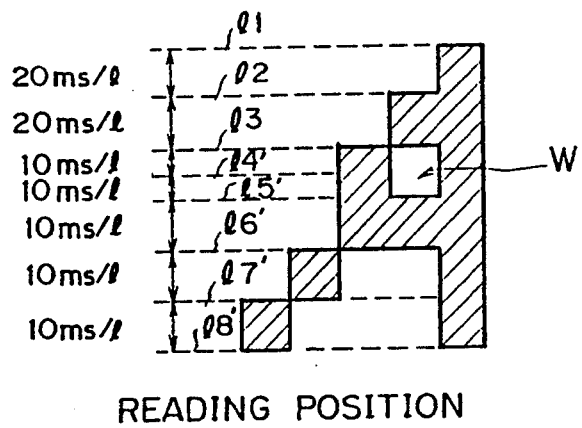
Fig. 1B  READING POSITION
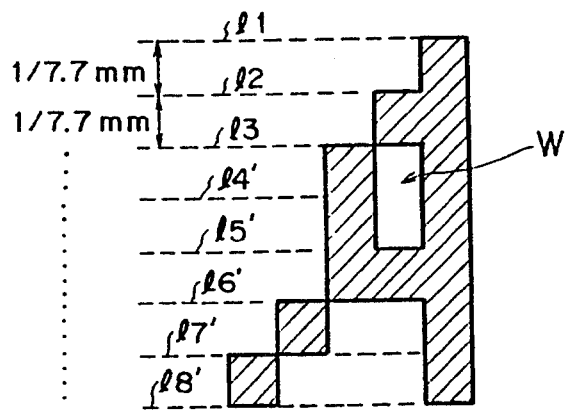
Fig. 1C  OUTPUT IMAGE
PRIOR ART

MANUSCRIPT

READING POSITION OF PRIOR ART

READING POSITION OF PRESENT INVENTION

OUTPUT IMAGE OF PRIOR ART

OUTPUT IMAGE OF PRESENT INVENTION

IMAGE READING SYSTEM USING AN INTERRUPTION OF A PULSE TRAIN TO ADJUST A SCANNING PERIOD

This is a divisional of Pat. No. 5,278,675 issued Jan. 11, 1994, now U.S. Pat. No. 5,278,675, which is a continuation application of Ser. No. 07/442,873 filed on Nov. 29, 1989, now abandoned.

BACKGROUND OF THE INVENTION

The present invention relates to an image reading system such as a facsimile, and more particularly to an image reading system using a charge storing type image sensor to minimize a reading distortion.

Recently demand has been increasing for a low-cost, miniaturized image reading apparatus such as an image scanner and a facsimile, and also for a low-cost, miniaturized image sensor and motor to be used with such an image reading apparatus.

To meet this demand, a contact-type image sensor has been developed in place of a CCD. The reading period has thus been increased from 2 ms/line in a CCD scanner to, for example, 5 ms/line or 10 ms/line, and thus, the reading speed/line has been slowed down. The line means a main scanning line, called "line" hereinafter. The contact-type image sensor is a charge-storing-type image sensor which stores a predetermined amount of charge subjected to an optical electrical conversion in a predetermined period. Therefore, the amount of charge stored varies with the period. Thus, it is necessary to perform a scanning within a predetermined period.

To meet the low-cost requirement for the motor, a motor with a low response characteristic and low positional accuracy is adopted. Therefore, the reading position of the contact-type image sensor is shifted by a large amount.

In a conventional facsimile, a manuscript paper starts from a stopped state, increases its speed to a maximum and then decreases its speed until it stops. This is conducted in accordance with a motor control based on the amount of data which can be transmitted in one line.

For a more detailed explanation, the facsimile determines, based on training before a transmission of image data whether the data of the currently used line can be transmitted, for example, at 9600 bit/sec. If it cannot be transmitted at 9600 bit/sec, the facsimile further determines whether it can be transmitted at 7200 bit/sec. In accordance with such training, data is transmitted selectively at various speeds such as: 14000 bit/sec, 9600 bit/sec, 7200 bit/sec, 4800 bit/sec and 2400 bit/sec. The speed at which a manuscript paper to be transmitted is read should be variable. Thus, in a facsimile, the image data which has been read is compressed, the compression ratio varying depending on the kind of image. Furthermore, the transmission speed is not constant during reading. To prevent the buffer for storing the transmission data from being empty, and to prevent the buffer from overflowing, the speed at which the paper is transmitted should be controlled. Therefore, a stepping motor, for example, can be used to control the period of the driving pulse. An image sensor of a reading apparatus or a manuscript paper is moved a predetermined distance in the sub-scanning direction at each driving pulse.

Conventionally, the speed control of the image sensor or the manuscript paper is performed within a period given by an integer times the period for reading by an image sensor. However, when the reading period of an image sensor becomes slow, such as 5 ms/line or 10 ms/line as stated above, the reading position shift of the image sensor cannot be disregarded.

The manuscript shown in FIG. 1A is moved under the condition that a reading time period by the image sensor is at 10 ms/line scan, the pulse rate required for the stepping motor is 4 pulses/line, the sub-scanning line density is 7.7 lines/mm and the scanning speed of the reading apparatus (i.e. a reading cycle of the data on one main scanning line) is changed from 20 ms/line scan to 10 ms/line scan, for example. As recited above, the scanning speed of the reading apparatus (which is determined by the relative speed between the manuscript paper and the image sensor and is called an apparatus scan hereinafter) varies with the amount of data stored within a memory in which reading data in the reading apparatus is stored and the state of a line to which a facsimile apparatus is connected.

The reading of the pattern shown in FIG. 1A is described with regard to lines 11 to 17. The apparatus scan is at a speed of 20 ms/line from lines 11 to 13 and is at 10 ms/line between lines 13 and 17 (i.e. the speed of the apparatus scan is changed at line 13 to a high speed), the rotation speed of the motor cannot be immediately changed to 10 ms/line. As a result the positions of lines 14 and 15 are delayed as shown by lines 14' and 15' in FIG. 1B. Thus, when the manuscription speed changes, the sub-scanning line density of 7.7 lines/mm is not satisfied and the reading width is narrowed.

The image obtained by this reading operation is reproduced at a rate of 7.7 lines/mm. As shown in FIG. 1C, the portion between lines 13 and 15' of the character is extended. When the speed of the apparatus scan is reduced, the situation is reversed.

When the reading time period of the image sensor is at 10 ms/line scan, the pulse rate required for the motor drive is 4 pulses/line, the sub-scanning line density is 7.7 lines/mm, and the scanning speed of the reading apparatus is changed from 80 ms/line to 10 ms/line, then, the reading position of the image shown in FIG. 6A is as shown in FIG. 6B in a prior art apparatus, and reading lines are spaced at equal intervals in a longitudinal direction in FIG. 6B. As a result, an output is obtained as shown in FIG. 6D.

In the prior art, where an image sensor reads at 10 ms/line scan, the scanning speed of the apparatus is increased from 40 to 30 to 20 to 10 ms/line scan. Then, upon a change from 20 to 10 ms/line, a shift in reading position in which a reading is conducted, is 1/154 mm/line, then the density of a sub-scanning line is 7.7 line/mm. When the speed of an apparatus scan increases from 30 to 20 ms/line, the shift in position becomes 1/30.8 mm/line.

When a motor with a poor transient response characteristic is used, the shift in reading position is caused when the reading position is controlled by a motor at the rate of an integer times a period of reading by an image sensor, thereby decreasing the quality of the image to be output.

SUMMARY OF THE INVENTION

Therefore, an object of the present invention is to provide an image reading system in which a shift in image reading position upon a reading of an image by a reading apparatus is decreased.

A feature of the present invention resides in an image reading system comprising a charge storing type image sensor, a device for driving a manuscript or image sensor, a device for outputting a driving pulse for driving the driving device, a speed setting device for determining a driving state of said driving device, and a device for providing a stopped period of the output of the driving pulse in a predetermined period in an apparatus scan based on the output of the speed setting device so that the difference of the driving speed between the different apparatus scan periods is decreased.

BRIEF DESCRIPTION OF THE DRAWINGS

FIGS. 1A to 1C are views for explaining a problem of the prior art.

DESCRIPTION OF THE PREFERRED EMBODIMENT

Figure 2A:
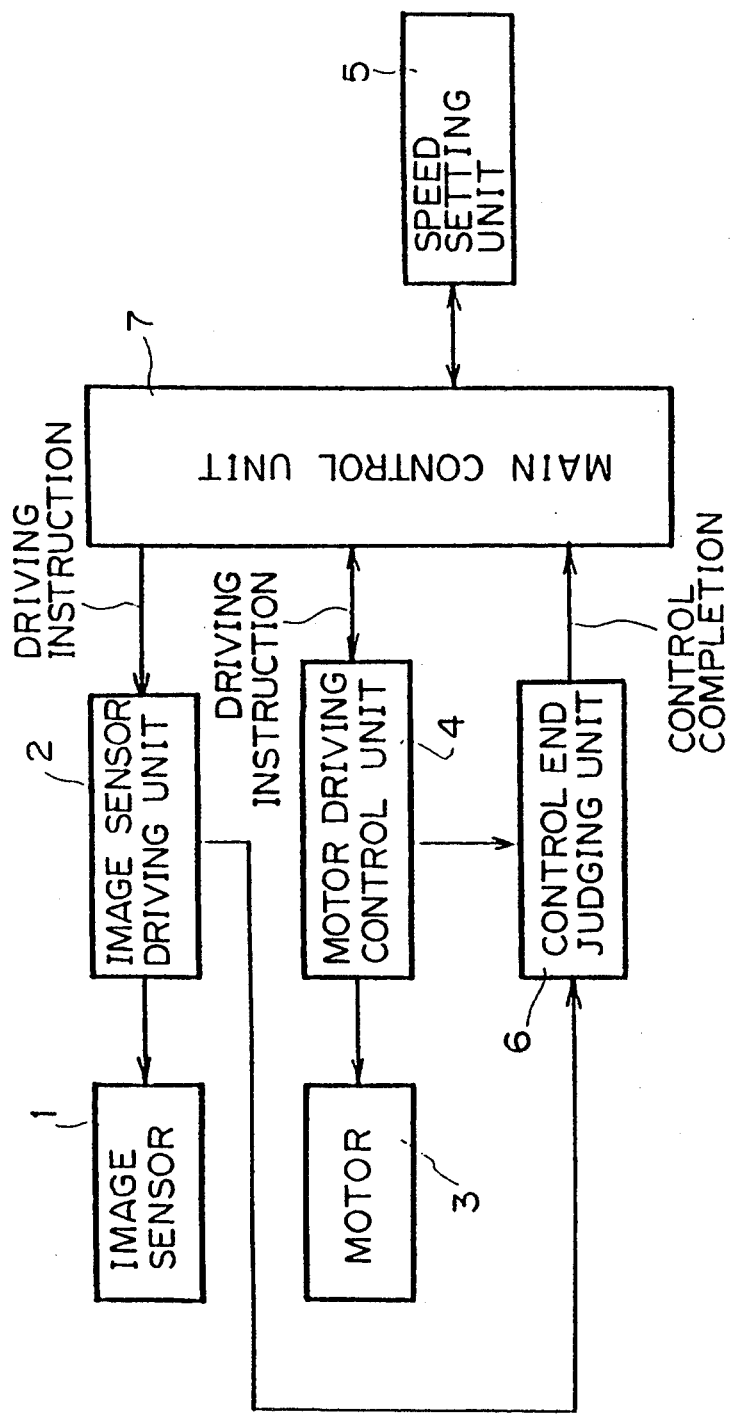
FIGS. 2A to 2E are views for explaining the principle of the present invention.

FIG. 2A shows a principle of the present invention which provides an image sensor driving unit 2 for driving a charge- storing-type image sensor 1, a motor drive control unit 4 for driving a stepping motor 3 and a speed determining unit 5 for setting the speed of pulse motor 3.

Figure 2B:
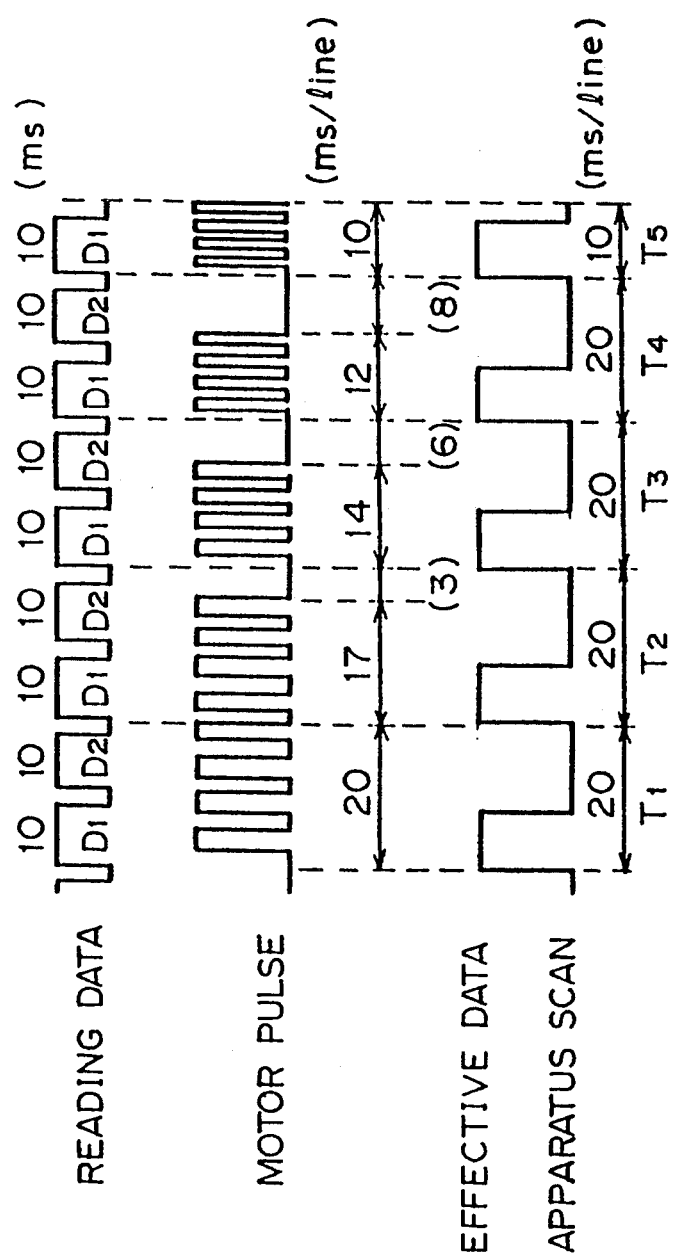

For example, when the apparatus scan by a reading apparatus using an image sensor whose reading time period is 10 ms, namely, a one-line data-obtaining cycle, is increased from 20 ms/line to 10 ms/line, cycles $T_1$, $T_2$, $T_3$ and $T_4$ of an apparatus scan are executed at 20 ms/line as shown in FIG. 2B. Thus, reading data D2 is not used when the reading data, for example, initial data D1 only, is made effective. Then, the motor pulse is controlled in the following manner. At cycle $T_2$ of an apparatus scan, 4 pulses are provided during a period of 17 ms and a supply of pulses is stopped during a period of 3 ms. At cycle $T_3$, 4 pulses are supplied during a period of 14 ms and thus a supply of pulses is stopped during a period of 6 ms. At cycle $T_4$, 4 pulses are provided during a period of 12 ms, thereby stopping a supply of pulses during a period of 8 ms.

In this example, stepping motor 3 is subjected to a drive of 4-pulses/line. Therefore, a setting of the pulse supply, including a stopping period as recited above, is performed by speed setting unit 5 and motor drive control unit 4 is controlled by main control unit 7 based on a setting signal from speed setting unit 5, thereby producing a pulse as stated above and controlling stepping motor 3. Control end judging unit 6 notifies a control completion within a scan period of respective apparatuses.

Figures 2C, 2D, 2E:
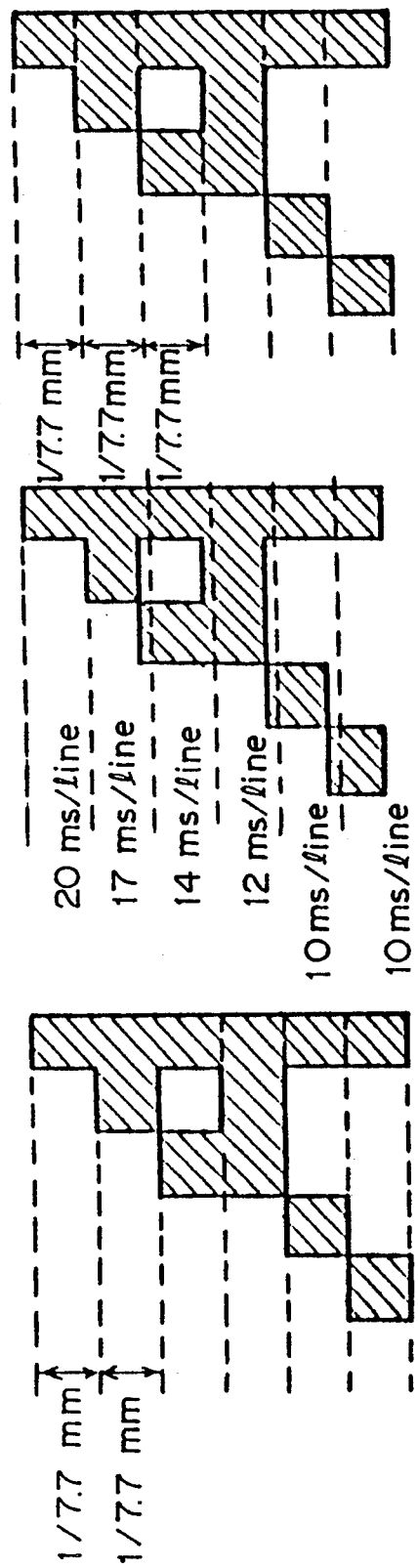

Therefore, when the manuscript shown in FIG. 2C is read, the reading position of the image sensor is as shown in FIG. 2D. The reading of the data is performed twice per line, as stated above, and the former reading is made to provide effective data. Thus, the resulting image output becomes as shown in FIG. 2E, thereby decreasing the influence of a shifting of a reading position.

An embodiment of the present invention will be explained by referring to FIGS. 3A to 6E.

Figure 3A:
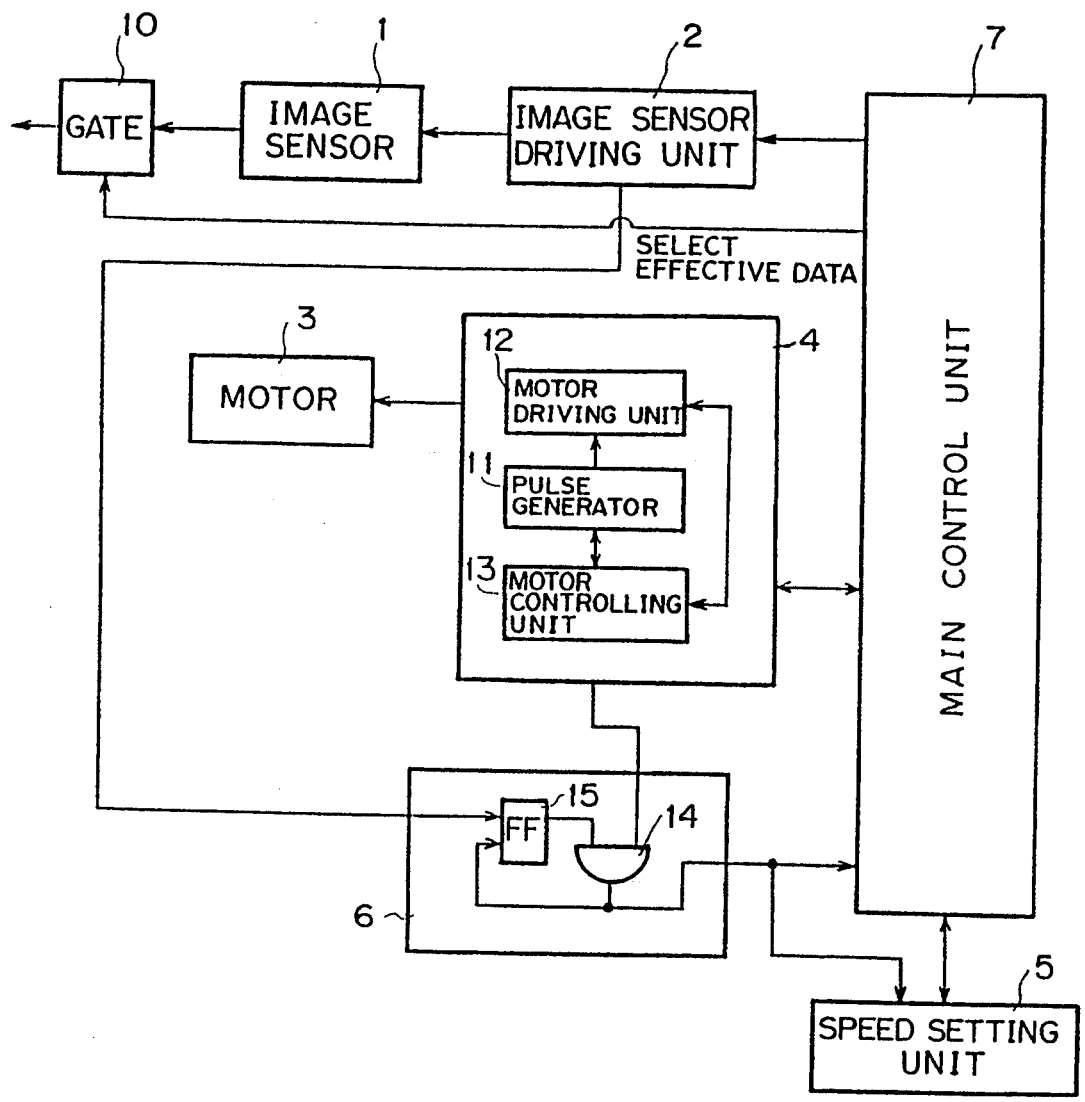
FIG. 3A is a block diagram of an embodiment of the present invention.
Figure 3B:
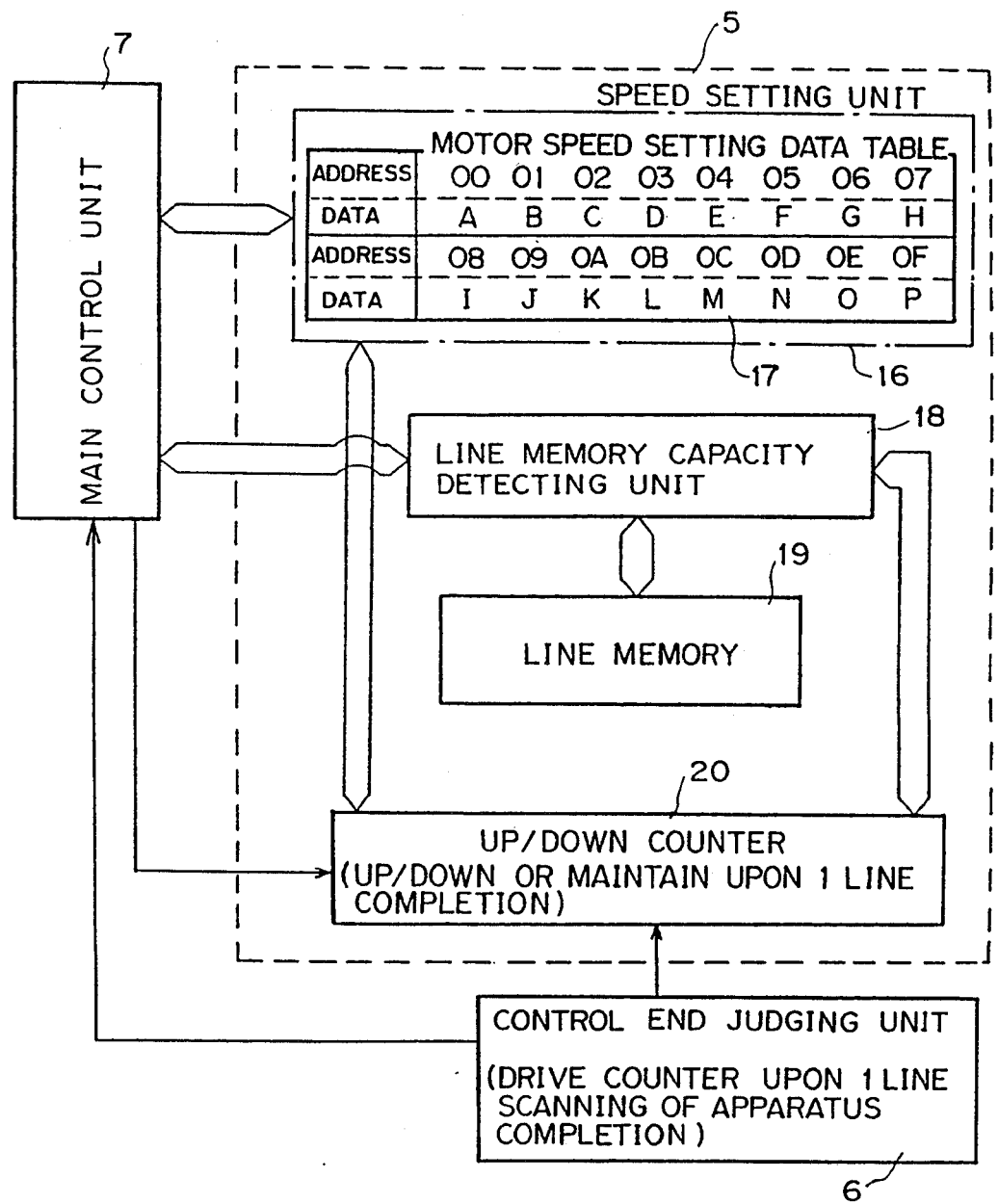
FIG. 3B is a block diagram showing the structure of the speed setting unit.
Figure 4A:
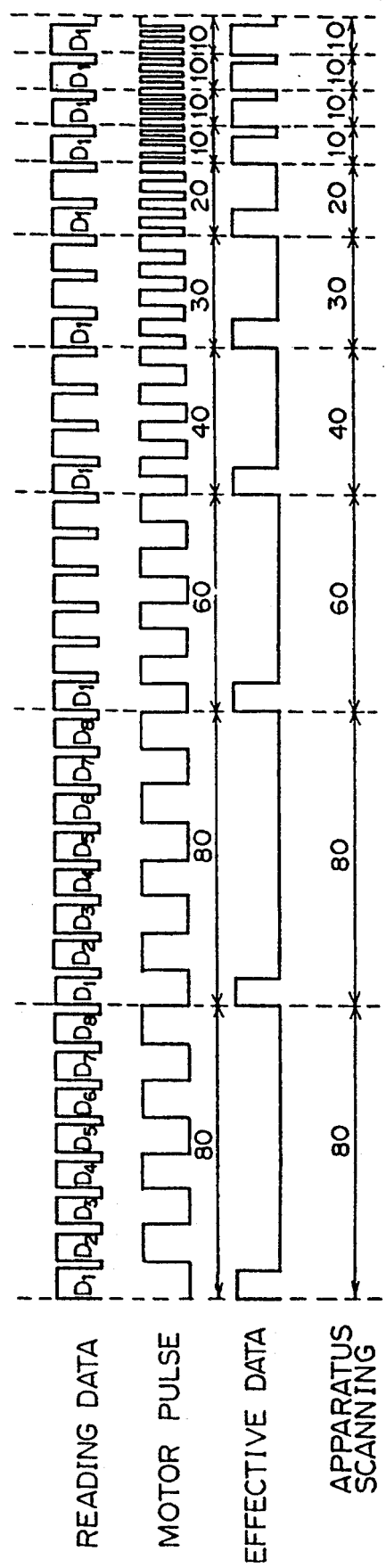
FIGS. 4A and 4B are views for explaining a comparison between the timings in the prior art and in the present invention.
Figure 4B:
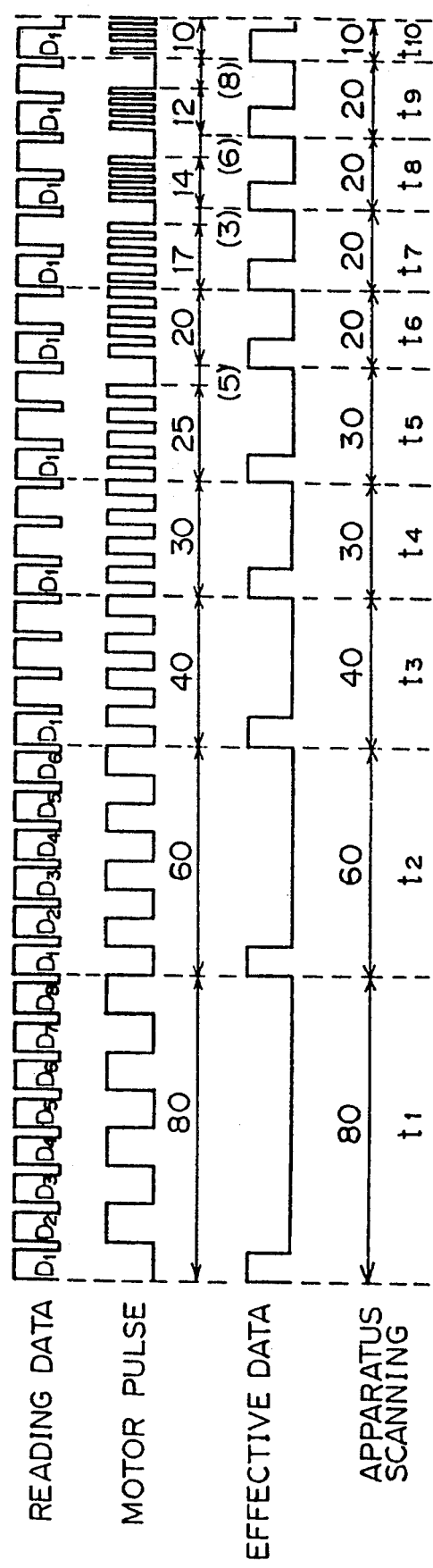
Figure 5A:
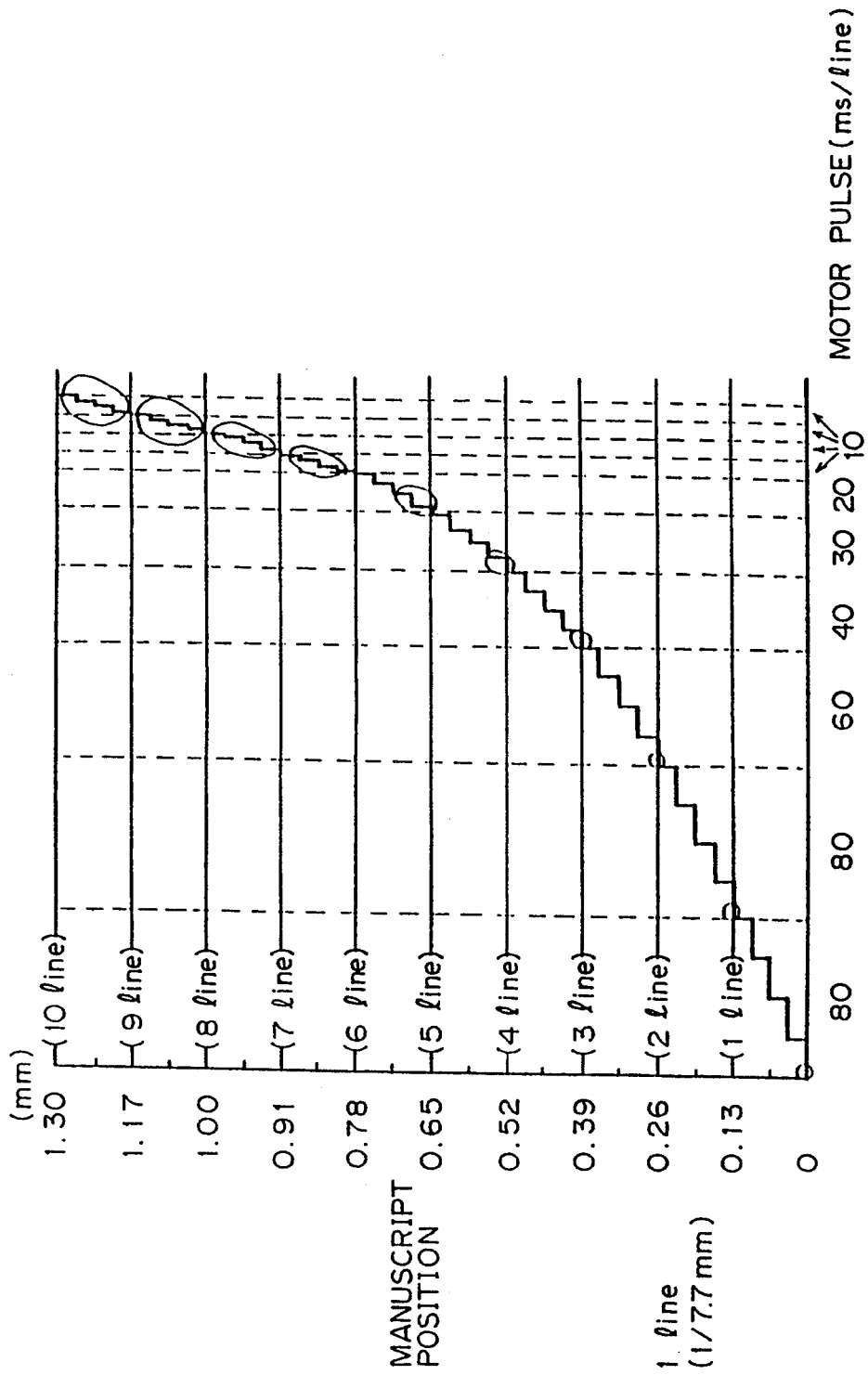
FIGS. 5A and 5B are views for explaining a shift in a reading position by comparing the prior art with the present invention.
Figure 5B:
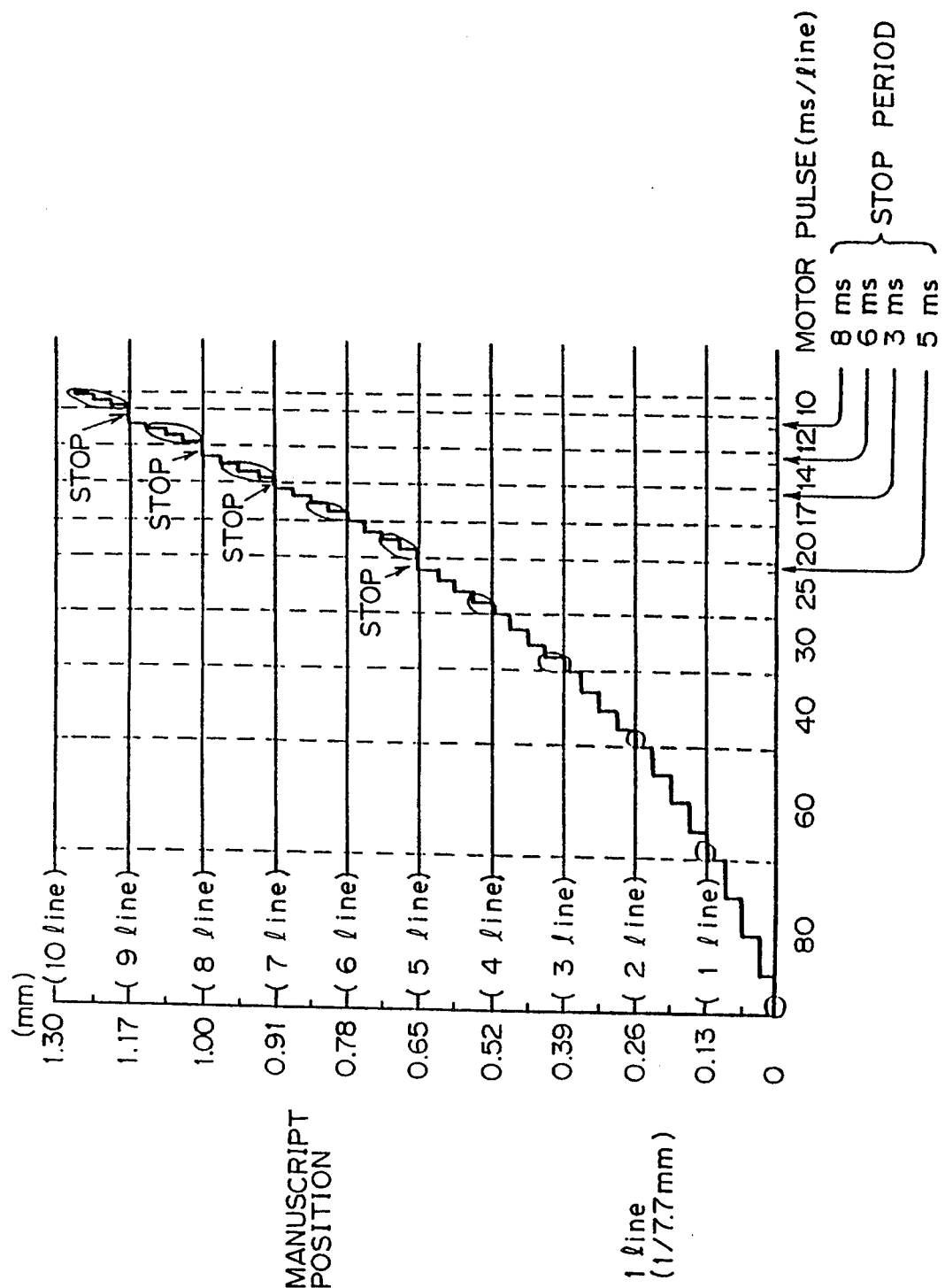

FIG. 3A shows the structure of one embodiment of the present invention, FIG. 3B shows the structure of the speed setting unit of this embodiment, FIGS. 4A and 4B are respectively views for explaining the timing chart of the prior art and that of the present invention, and FIGS. 5A and 5B are respectively views for explaining a shift of a reading position in the prior art and in the present invention.

The same reference numbers are used in FIGS. 2A and 3A to represent the same portions. The embodiment shown in FIG. 3A comprises gate 10, pulse generator 11, motor driving unit 12, motor controlling unit 13, AND circuit 14 and latch 15.

Gate 10 is used to select an effective reading data obtained from a charge-storing-type image sensor. For example, as shown in FIG. 4B, where the apparatus scanning speed is increased from 80 ms/line to 10 ms/line, and a 10 ms/line scan can be used as an image sensor, and a read data D1, D2 ... of image sensor 1 are output every 10 ms. The first reading data D1 of the respective apparatus' scan period is made effective, as gate 10 is controlled to perform an on-and-off operation in synchronization with a scan period of respective apparatuses. Therefore, an effective data-selecting signal is output from main control unit 7 and effective timing data, as shown in FIG. 4B, is output from gate 10.

Pulse generating unit 11 outputs a motor pulse signal for driving stepping motor 3 and apparatus scanning is increased from 80 ms/line to 10 ms/line as described above. Therefore, a motor pulse signal is output, as shown in FIG. 4B. Namely, until the speed of the apparatus scan is increased from 80 to 60 to 40 to 30 ms/line, motor pulses are output during the entire data-reading period. During the period from the second 30 ms/line to the 10 ms/line, the motor pulses are selectively lacking, thereby controlling a shift in reading position. Namely, a motor stopping period of 5 ms is provided in period $t_5$, 3 ms in period $t_7$, 6 ms in period $t_8$ and 8 ms in period $t_9$.

During the period in which the motor is stopped, four pulses are required to drive an image data reader by one line where the scanning speed or reading period of image sensor 1 is 10 ms and the apparatus scanning period is X ms, 10 ms=X ms/4 pulses and thus X=40 ms. Therefore, the period must be selectively provided during which the motor is stopped to correct the reading position when the apparatus scan period is smaller than 40 ms. However, this period is not necessary when the apparatus scanning period is more than 40 ms.

Suppose that the reading period of the image sensor is m and one pulse period of the motor pulse is n. When $n \geq m$, the motor need not be stopped. However, when $n < m$, the period during which the motor is stopped should be provided to minimize the speed difference caused by the drive of a motor by the motor pulse.

When a stepping motor with a bad transient characteristic is used, the stepping motor cannot be responsive to a change in rotation speed upon a high rotation speed and thus phase delay is produced when the rotation increases in a stepped manner and a phase advance is generated when it decreases in a stepped manner. In order to decrease the phase advance and delay, the reading period is made an integer times the reading speed by the image sensor where the speed of the stepping motor is changed in a stepped manner, for example, 20 ms/line to 10 ms/line, thereby changing the driving pulse of the step motor and stopping its driving pulse during the period of difference between the 4 driving pulses of the step motor and the reading period of the image sensor, the difference being caused by a change in the rotation speed of the step motor in a stepped manner.

As shown in FIG. 3A, pulse generator 11 is provided with a counter. A count starts when the pulse generating period Tpms is given and a single pulse signal is produced every time ¼ Tpms is counted and the ending signal is produced upon completion of a TP count. Motor driving unit 12 produces a motor pulse in accordance with a motor pulse signal supplied by pulse generator 11.

Motor control unit 13 outputs an initiation signal or end signal and other control signals to pulse generator 11 or motor driving unit 12 in accordance with a control signal transmitted from main control unit 7 comprising a processor. A gate signal is output to AND circuit 14 of control end judging unit 6 at every fourth pulse-motor signal. A control and judging signal "1" is output when an AND condition of a reading data $D_1$ of image sensor 1 at apparatus scan periods $t_1$, $t_2$ . . . and every fourth motor pulse is established. Therefore, control end judging portion 6 provides latch unit 15 to maintain a falling point of the first reading data $D_1$, thereby checking the AND condition. When the output of AND circuit 14 is "1", latch unit 15 is reset.

FIG. 3B shows a structural view of speed setting unit 5. Speed setting unit 5 comprises ROM 16 with motor speed setting data table 17, detecting unit 18 for detecting a capacity in which the data is stored in line memory 19, line memory 19 comprising RAM and up/down counter 20 for performing up or down functions or maintaining functions.

Next, an operation of the embodiment of the present invention shown in FIG. 3B is explained as an example in which the speed of apparatus scanning increases from 80 to 10 ms/line as shown in FIG. 4B.

(1) Line memory capacitor detecting unit 18 detects the present vacant capacity in line memory 19 in accordance with an instruction from main control unit 7. Main control unit 7 then performs an up/down or maintaining operation on counter 20 as a result of the detection of the vacant capacity of line memory 19. Counter 20 outputs the address of table 17. When the address value represented by the output of counter 20 is "0 0", data A corresponds to the address "0 0", namely, the data which is a motor pulse signal corresponding to an apparatus scan period of 80 ms/line and represents the motor pulse generation period corresponding to the motor pulse shown in FIG. 4B. It is transmitted from ROM 16 to main control unit 7 and output from main control unit 7 to motor driving control unit 4. This enables pulse generator 11, which has the same structure as the prior art apparatus, to output the motor pulse. Namely, the motor pulse train in which the fourth motor pulse falls at the end of period $t_1$ is produced and is transmitted to stepping motor 3 by motor driving unit 12 to drive stepping motor 3. At a period $t_1$, reading data $D_1$ to $D_8$ of image sensor 1 are output and initial reading data $D_1$ is controlled to be output to gate 10 from main control unit 7. Thus, the effective data is output at a timing shown in FIG. 4B. The falling-edge timing signal of reading data $D_1$ is transmitted from image sensor driving unit 2 to latch unit 15, thereby enabling latch unit 15 to produce "1". At period $t_1$, a timing signal "1" representing a falling-edge of the fourth motor pulse is output from motor driving control unit 4 to an AND circuit 14 to turn on. Therefore, a control end judging unit 6 outputs a control completion signal to main control unit 7 and an on signal of AND circuit 14 resets latch unit 15.

(2) Such a control can be conducted sequentially from the periods $t_2$ to $t_4$. Namely, when a lack of capacity is continuously recognized by line memory capacity detecting unit 18, counter 20 is incremented to increase the motor speed, thereby varying the address values "00", "01", "02" and "03". Data A, B, C, D are stored in table 17 in correspondence with the address values "00" "01" "02" and "03" and, based on these values, motor driving control unit 4 varies the rotation of the motor so that it scans from 80 ms/line to 30 ms/line.

When main control unit 7 requests a motor pulse signal from speed setting unit 5 at period $t_5$, speed setting unit 5 outputs four motor pulse signals, namely, data F of the address 04 in table 17, for the first 25 ms of 30 ms period. Therefore, the corresponding motor pulse is output from pulse generator 11 and stepping motor 3 completes an operation during the first 25 ms at the period $t_5$ responsive to the above operation and is put in a stopped state for the remaining 5 ms. Timing signal "1" is output from motor driving control unit 4, 25 ms after the start of period $t_5$, namely, at the time of the fall of a fourth motor pulse. Thus AND circuit 14 is turned on, thereby enabling control end judgement unit 6 to output the control completion signal. However, main control unit 7 recognizes that period $t_5$ has a time width of 30 ms, and a control at period $t_6$ starts 5 ms after the control end signal is transmitted.

(3) At period $t_6$, the same control as in (1) is conducted. At periods $t_7$ to $t_9$, the same control as in (2) is conducted. Namely, at period $t_7$, main control unit 7 outputs four motor pulse signals for an initial 17 ms based on the output from speed setting unit 5. Therefore, a similar motor pulse is output from stepping generator 11 and the pulse motor 3 is driven for the initial 17 ms of period $t_7$ in accordance with the output of pulse generator 11 and is put in a stopped state for the remaining 3 ms period. Such operation is conducted in periods $t_8$ and $t_9$. Stepping motor 3 operates for the first 14 ms at period $t_8$ and is put in a stopped state for the remaining 6 ms period. Stepping motor 3 operates for the initial 12 ms of period $t_9$ and is put in a stopped state for the remaining 8 ms period. Only the reading data $D_1$ is used as an effective data for a respective period. Such control can be conducted up to period $t_{10}$.

In the prior art, stopped states are not provided as shown in FIG. 4A. Thus, the effective data of the manuscript becomes as shown by the circles in FIG. 5A, resulting in an inaccurate image output being produced because of an existence of shift of the reading position, as stated above.

In contrast, the present invention provides a stopped period as shown in FIG. 4B and the resulting reading area on a manuscript is as shown by the circles in FIG. 5B. Therefore, as shown in FIGS. 6C and 6E, the present invention can greatly decrease the influence of a shift in a reading position.

Figure 7:
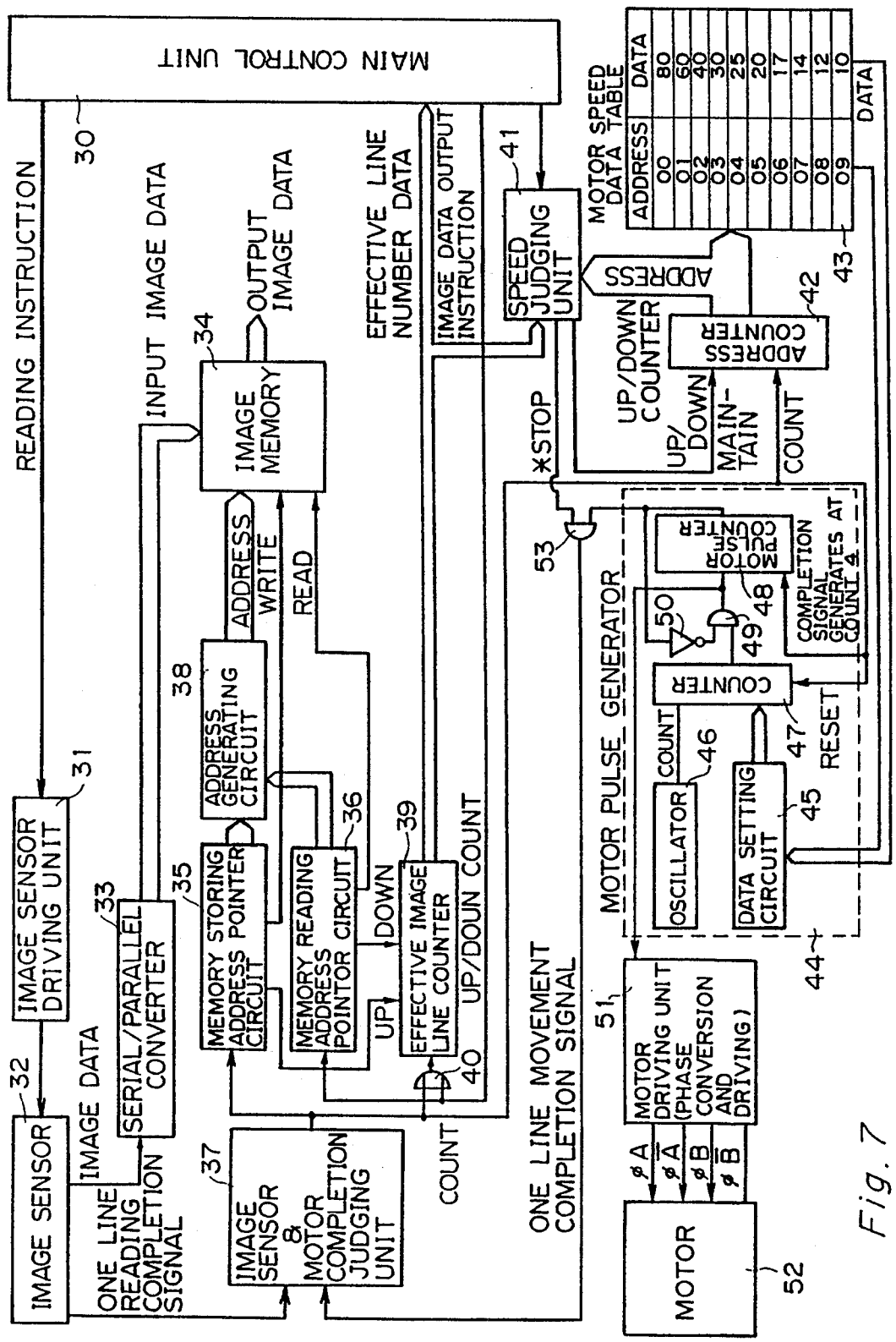
FIG. 7 is a detailed circuit diagram of an embodiment of the present invention.

FIG. 7 shows the embodiment of the present invention in more detail.

Control unit 30 controls an entire apparatus such as a facsimile apparatus. When a document is transmitted by a facsimile apparatus, a set of a manuscript to be transmitted is recognized by control unit 30 from a signal obtained from a sensor (not shown). When an operator depresses the transmission key, control unit 30 outputs a reading instruction to image sensor driving unit 31. In accordance with this reading instruction, image sensor driving unit 31 starts a drive of image sensor 32.

Image sensor 32 is a sensor of a charge-storing-type which reads an image data of one line by driving image sensor driving unit 31 and outputs one line of dot data in a dot serial manner. This dot serial data is applied to serial/parallel converting unit 33 to provide parallel data to be applied to image memory 34 as input image data.

The read out parallel data is output in an FIFO structure. This embodiment has memory reading address pointer 35 and memory writing address pointer 36 which control a reading address and writing address of image memory 34. When image sensor 32 reads data, a signal indicating a completion of a one-line reading is output to image sensor and motor completion judging unit 37. Image sensor and motor completion judging unit 37 comprises two input AND gates, (later described). One line moving completion signal designating a completion of movement by one line is made to H level and when a one reading completion signal is at H level, H level is output. The H level output of image sensor and motor completion judging unit 37 is applied to memory writing address pointer 35 to increment the value of the pointer. Memory writing address pointer 35 produces an input image data output from image sensor 32 to produce an address pointer designating the position at which data should be stored in image memory 34. When input image data is stored in image memory 34, address generator 38 generates a storing address of image memory 34 based on an address output from memory writing address point 35, thereby making an access to image memory 34. Namely, every time one line is read, data is stored in image memory 34 and memory writing address pointer 35 increments the address point value.

On the other hand, when memory writing address pointer 35 applies an up signal to effective image line counter (up/down counter) 39, the output (H level) of image sensor and motor completion judging unit 37 is applied to a count input of effective image line counter 39 through OR gate 40. When an up signal is added to effective image line counter 39, and the H level output signal is applied to effective image line counter 39 from image sensor and motor completion judging unit 37 through OR gate 40, effective image line counter 39 increments a count value.

Image memory 34 is a buffer for temporarily storing read out input image data and the image data to be transmitted is read out from image memory 34 during the period when control unit 30 reads a manuscript by using the image sensor. Therefore, control unit 30 adds the image data output designating signal into effective image line counter 39 through memory reading address pointer 36 and OR gate 40. Memory reading address pointer 36 designates a reading address pointer of image memory 34 upon reading and address generator 38 generates a reading address based on the output of address pointer 36, thereby making access to image memory 34. Based on this access, image memory 34 outputs read-out image data. Memory reading address pointer 36 applies a down signal to output effective image line counter 39, enabling effective image line counter 39 to perform one down count. Namely, effective image line counter 39 performs an up count every time one line of data is stored in image memory 34 and performs a down count every time one line data is read out from image memory 34. Therefore, the value of effective image line counter 39 is equal to the number of lines of data stored in image memory 34. Control unit 30 receives the output of effective image line counter 39, namely, effective line number data. When data of image memory 34 overflows if the manuscript is read at the present speed and control unit 30 decreases a movement speed for reading the manuscript to avoid the overflow data in image memory 34. When the number of effective data in image memory 34 is relatively small, the speed at which the manuscript is read is increased to avoid the situation in which data does not exist in image memory 34. In a modem used for such a facsimile apparatus the data must be transmitted continuously for one manuscript unit and the reading speed is controlled to avoid a situation in which the number of effective lines becomes 0 during the period of reading one transmission. A control of a reading speed will be explained in more detail hereinafter.

The output of effective image line counter 39 is applied to speed judging unit 41. Speed judging unit 41 determines based on the effective line number, whether the present speed should be increased, maintained or decreased. The result of the determination in speed judging unit 41 is output to address counter 42 comprising an up/down counter. The address counter 42 has an up input terminal and a down input terminal and speed judging unit 41 applied an instruction signal (H level) to an up input terminal when it determines that an increase in speed is required. The instruction signal (H level) which is output based on the signal from image sensor and motor completion judging unit 37 changes address counter 42. When speed judging unit determines that the present speed should be reduced, a clock is input to the down count input terminal of address counter 42 and whether the address counter 42 performs an up or down count is determined based on the content of the data table 43. Address counter 42 changes the count value based on the clock. The count value of address counter 42 is applied to an address terminal of motor speed data table 43. Motor speed data table 43 outputs the speed data corresponding to the count value selected from the speed data previously stored in motor speed data table 43. At this time, speed judging unit 41 performs a role for setting the address count value within a range of data. It then generates a *STOP signal when image memory 34 overflows even when a writing is conducted at the lowest speed and stops the reading operation by AND gate 53.

Motor speed data table 43 stores 80, 60, 40, 30, 25, 20, 17, 14, 12, 10 in accordance with the addresses 00 to 90 as shown in FIG. 7. Here, values 80, 60, . . . are in msec corresponding to the reading speed of one line, which is explained above.

The output of motor speed data table 43 is applied to motor pulse generator 44 and data setting circuit 45. Then pulse generator 44 generates a pulse with a period corresponding to that of motor speed data table 43, thus enabling a period of the motor pulse to be synchronized with a reading period of image sensor 32. The output of motor speed data table 43 is applied to data setting circuit 45 which stores the data. The data corresponds to the period of the motor pulse and counter 47 is a presettable counter which loads the speed data stored in data setting circuit 45 upon starting the count, thereby performing a down count. The clock period of oscillator 46 is ¼ msec and the output of the oscillator is applied to counter 47. The pulse of ¼ the period of the value stored in the data setting circuit 45 is applied to motor pulse counter 48 and motor driving unit 51 through AND gate 49 by means of counter 47. At this time, motor pulse counter 48 does not count four pulses. Therefore, AND gate 49 is turned on through inverter 50.

Motor pulse counter 48 is a ¼ frequency divider which outputs one line movement completion signal after four clocks are applied to counter 47. As the output of motor pulse counter 48 is applied to AND gate 49 through inverter 50, inverter 50 is turned off and thereafter the output clock from the counter 47 is prevented from being applied to motor pulse counter 48 or motor driving unit 51. Therefore, until the reset signal is applied, motor pulse counter 48 is put in a stopped state and this corresponds to the period necessary for achieving a synchronization with a reading period of image sensor 32.

When motor pulse counter 48 is put in a stopped state in accordance with an above operation, a one line movement completion signal is output. Therefore, when image sensor and motor completion judging unit 37 receives a one-line reading completion signal, it output an H level signal, which resets motor pulse counter 48. Counter 47 advances the counting operation and is simultaneously reset by outputs of H level from image sensor and motor completion judging unit 37 and is therefore returned to its initial state to perform the same operation repeatedly.

The output of counter 47 is applied to motor driving unit 51 through AND gate 49 to drive stepping motor 52 to advance the phase at every one pulse, thereby controlling the rotation of the motor to move the manuscript, for example.

The above operation is summarized as follows. Motor pulse generator 44 produces four pulses based on the value stored in data set circuit 45 and provides a stopped period to be synchronized with n times the reading period of image sensor 32.

Motor speed data table 43 previously stores the data corresponding to the required speed and increases a rotation speed with less phase delay even if a requirement for speeding up the motor is continuously produced, thereby suppressing a data shift upon reading a manuscript.

In FIG. 4B, the motor does not stop during the stopped period of $t_5$ to $t_9$ but the rotation of the motor increases gradually as the period in which the driving pulse is produced is short. In the prior art, the rotation is changed abruptly, thereby causing a relatively large phase delay. In the present invention, the rotation of the motor is increased gradually when it is changed, thereby decreasing the error caused by phase advance or phase delay.

In the embodiment of the present invention, a step motor for four phases is used but the step motor of the present invention is not limited to the four phase type. Motor pulse counter 48 formed on an n-digit counter corresponding to n phases of stepping motor 52 can be applied to an n phase pulse motor.

Figure 6A:
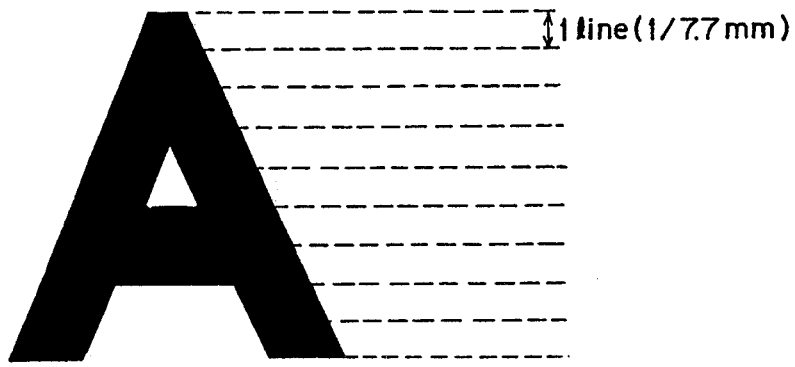
FIGS. 6A to 6E are views which compare the image data of the prior art with that of the present invention.
Figure 6B:
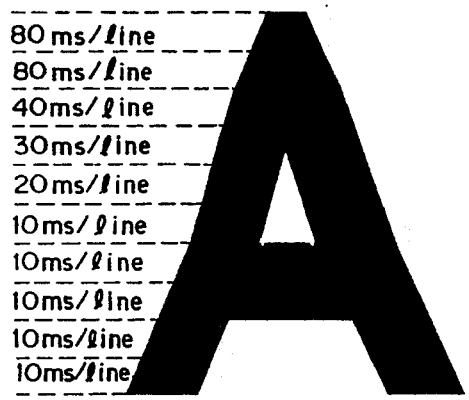
Figure 6C:
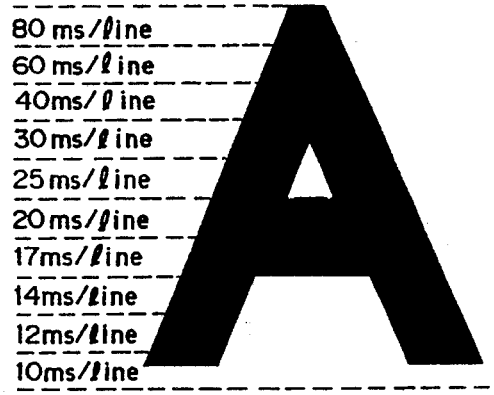
Figure 6D:
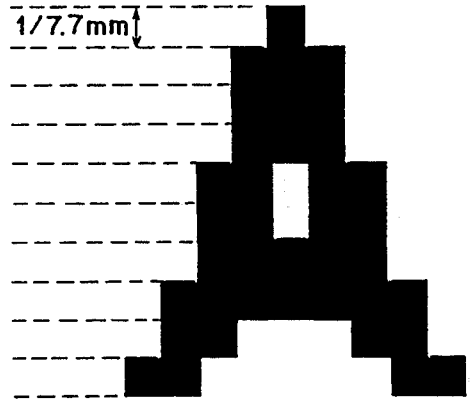
Figure 6E:
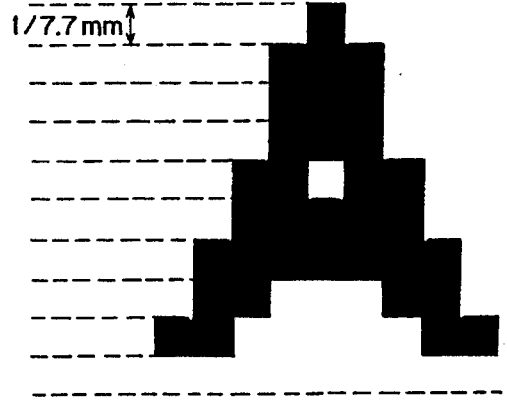

As shown in FIG. 6A, when the transcript is read and output, the reading position in the prior art is as shown in FIG. 6B. As a result, a transcript output with a distortion is produced, as shown in FIG. 6B. In contrast, in the present invention, the reading position of the image sensor is as shown in FIG. 6C and the output is subjected to less distortion, as shown in FIG. 6E.

As described above, the phase delay or advance always occurs when a rotation speed of the step motor is changed. Generally speaking, the error in phase is not important when the rate of the speed change is slow. However, if it is necessary to decrease the error caused upon a slow change of the rotation speed, for example, during the period from 80 ms to 30 ms/line in FIG. 6B and then a table shown in the above embodiment is provided to change the rotation speed at which a relatively small error is caused. For example, as shown in FIG. 6C, the rotation speed of the step motor is changed in a sequence of 80 ms, 60 ms, 40 ms, 30 ms, 25 ms and 20 ms. The speed of the step motor is not merely changed from 80 ms/line to 20 ms/line but is determined based on the content of the table in which the value of the speed for reducing the error of the phase is provided although the speed of the step motor changes, thereby enabling the manuscript or the image sensor to be moved with a high accuracy.

In the above embodiment of the present invention, the control of the pulse motor is conducted by a motor pulse with a period of integer times the reading period of the reading data for the period $t_1$ to $t_4$, based on the table content for the period when the change of the pulse motor is relatively small, and the speed of the pulse motor is changed from 20 ms/line to 10 ms/line, based on the table content for the period when the change of the rotation speed of the pulse motor is relatively large, and the empty time period time of the pulse is provided during the period of $t_6$ to $t_{10}$ in FIG. 4B, thereby enabling an accuracy of the apparatus to be further increased as a whole.

The above explanation is related to the case where the apparatus scanning speed is changed from 80 ms/line to 10 ms/line. However, the present invention is not limited to this case.

In the present invention, the apparatus for performing up and down control scan can be smoothly conducted without making the speed of the apparatus scan equal to an integer times the reading period of the image sensor and without making the motor control equal to integer times the reading period.

Therefore, according to the present invention, the accuracy of the reading position of the image sensor and the transmitting position of the manuscript can be greatly increased, thereby effectively decreasing the shift of the reading position.

What is claimed is:

1. An image reading system comprising:
   a charge storing type image sensor;
   driving means for driving a manuscript relative to said image sensor;
   a driving control means for outputting a driving pulse for driving said driving means;
   a speed setting means for determining a driving state of said driving means, and outputting to said driving means a predetermined number of pulses within one scan period; and
   stopping means for stopping the driving pulse for a predetermined time period to vary a reading speed during said one scan period based on an output of said speed setting means so that a difference in a driving speed, of the driving pulse, between different scan periods is decreased.

2. The image reading system according to claim 1, wherein a plurality of scan periods, which have the same period, are provided during a gradual increase or gradual decrease of the scan period, therein gradually decreasing or gradually increasing said predetermined time period of stopping said driving pulse within said plurality of scan periods based on the output of said speed setting unit.

* * * * *